June 6, 1961

D. COCEANO 2,987,033

ACOUSTICAL GENERATOR

Filed April 1, 1959

INVENTOR.
DOMENICO COCEANO
BY Wade Koontz
Arsen Tashjian
ATTORNEYS

June 6, 1961  D. COCEANO  2,987,033
ACOUSTICAL GENERATOR
Filed April 1, 1959  3 Sheets-Sheet 3

INVENTOR.
DOMENICO COCEANO
BY
ATTORNEYS

United States Patent Office 2,987,033
Patented June 6, 1961

2,987,033
ACOUSTICAL GENERATOR
Domenico Coceano, 111 Mill Drive, Levittown, Pa.
Filed Apr. 1, 1959, Ser. No. 803,546
10 Claims. (Cl. 116—137)
(Granted under Title 35, U.S. Code (1952), sec. 266)

The invention described herein may be manufactured and used by or for the United States Government for governmental purposes without payment to me of any royalty thereon.

This invention relates generally to an acoustical generator and more particularly is concerned with an apparatus for producing sounds of a character and intensity closely related to those emitted from high performance jet, ram-jet, and rocket engines.

Present high performance jet, ram-jet, and rocket engines produce sonic vibrations of such characteristics and magnitude that they are detrimental to the aircraft control components, particularly the electronic components. Since little is known of the effects of these sonic vibrations on the components, it would be desirous to subject the components to these noises and study the effects produced. To conduct such studies it is necessary to have an acoustical generator capable of simulating these engine noises.

Accordingly, it is an object of the present invention to provide an acoustical generator which will produce sonic vibrations having the intensity and characteristics of those emitted by jet and rocket engines.

Another object of the present invention is to provide an apparatus which is useful for studying the effects of noise on aircraft or other electronic control components.

Still another object of the invention is to provide an apparatus which can be used for conducting sonic vibration fatigue tests on aircraft parts and electronic components.

A still further object of the invention is to provide a sound generator which is extremely small, light weight, and simple compared to presently known sound producing equipment capable of producing sounds of equal intensity.

Another object of the invention is to provide an apparatus which can be used with a variable pressure chamber to simulate altitude conditions on the component being tested.

The acoustical generator described herein has no moving parts and is considerably less expensive to build and maintain than existing comparable devices.

These and other objects, features, and advantages will become apparent from the following description taken in connection with the illustrative embodiments in the accompanying drawings wherein.

Figure 1:
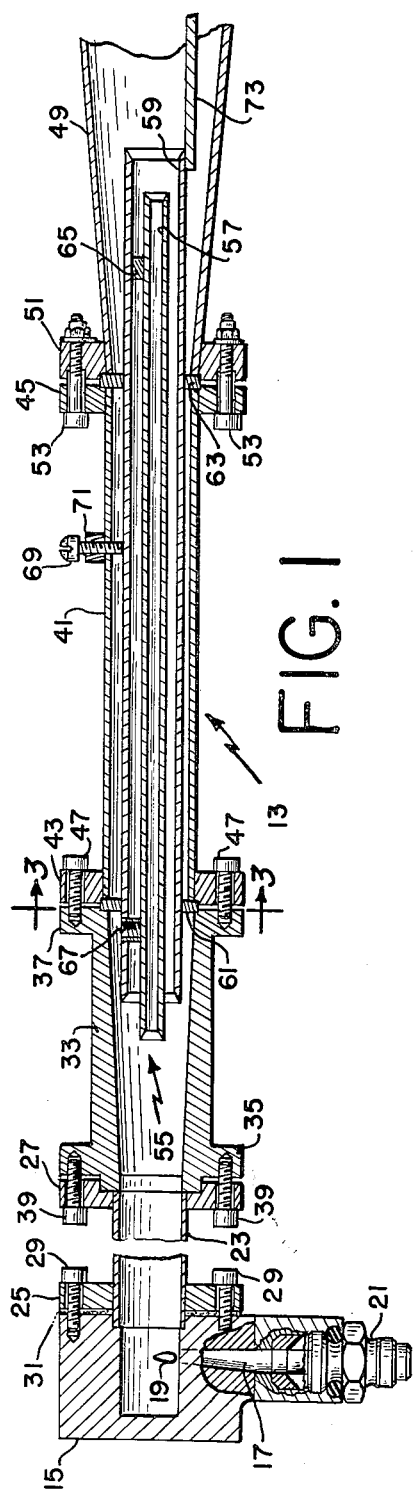
FIG. 1 is a longitudinal section through a sound generator constructed according to the invention.
Figure 3:
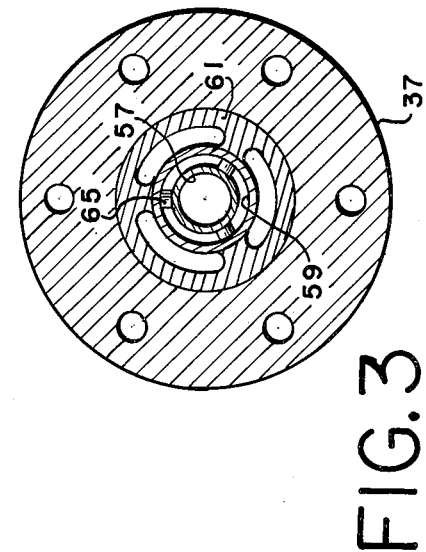
FIG. 3 is an enlarged sectional view taken along the line 3—3 of FIG. 1.

Referring now to FIG. 1 there is shown in longitudinal cross-section one embodiment of the acoustical generator 13. As here illustrated the device comprises a nozzle section 15 located at the inlet end. A fluid inlet valve 17 having an opening 19 is machined in said nozzle section 15 and operates to feed pressurized fluid to the generator 13. A standard union coupling 21 is provided for attachment to a pressurized fluid line (not shown).

A vortex tube 23 having the flanges 25 and 27 attached to each of its ends is secured to the nozzle section 15 by means of the bolts 29. A gasket 31 is provided to insure a fluid-tight junction between the vortex tube 23 and the nozzle section 15.

A diffuser section 33 having the flanges 35 and 37 formed around each of its end portions is secured to the downstream end of the vortex tube 23 by means of the bolts 39. The inside diameter of the diffuser section 33 is tapered so that the exit diameter is substantially greater than the inlet diameter.

Attached to the downstream end of the diffuser section 33 is a recovery tube 41 having the flanges 43 and 45 attached to each of its end portions. The bolts 47 serve to secure the recovery tube 41 to the diffuser section 33. The recovery tube 41 is diametrically constant along its length.

A horn 49 having the flange 51 attached to its smaller or upstream end is secured to the flange 45 on the recovery tube 41 by the bolts 53.

Figure 8:
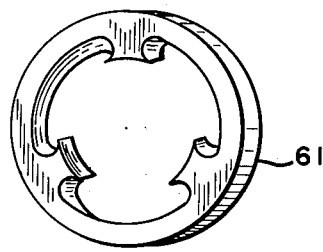
FIG. 8 is an enlarged detailed view of the tube spacer.

A sound producing member generally designated by the reference numeral 55 is disposed within the diffuser section and extends through the recovery tube 41 and into the horn 49. As shown in FIG. 1, the member 55 comprises an inner tube 57 and an outer tube 59. It will be noted that the upstream end of the inner tube 57 is offset so as to be closer to the outlet of the vortex tube 23 than the upstream end of the outer tube 59. The outer tube 59 is held in concentric alignment with the recovery tube 41 by the spacers 61 and 63 which are arranged to be held in position by the flanges 37 and 43, and 45 and 51, respectively. A more detailed view of these spacers 61 and 63 is shown in FIG. 8 and it can be seen that clear areas are provided to allow passage of pressurized fluid between the outer wall of the outer tube 59 and the inner wall of the recovery section 41. Attached to the inner wall of the outer tube 59 are a plurality of spacers 65 which operate to hold the inner tube 57 concentric to and in spaced relation with the outer tube 59. One of these spacers 65 is provided with a threaded hole into which a set screw 67 is inserted for locking the inner tube 57 to the outer tube 59 and preventing relative movement between the two tubes. Both ends of both tubes 57 and 59 are severely chamfered so as to form edges which are of substantially knife-edge sharpness.

A lock screw 69 is inserted through a threaded boss 71 and serves to secure the entire sound producing member 55 from movement relative to the remainder of the apparatus. When it becomes necessary or desirable to adjust the generator or vary its acoustical characteristics, the lock screw 69 is loosened and the position of the upstream end of the member 55 is varied in relation to the diffuser section 33. A rod 73 is attached to the end of the outer tube 59 and serves to permit adjustment of the sound producing member 55 by reaching into the horn 49, grasping the rod 73, and sliding the attached tube 59 upstream or downstream as necessary to obtain the desired output. The direction of fluid flow through the sound producing member 55 can be reversed by changing its position within the diffuser section. This is an important feature in using the acoustical generator as a testing means for simulating high altitude conditions and will be described in detail below.

Figure 2:
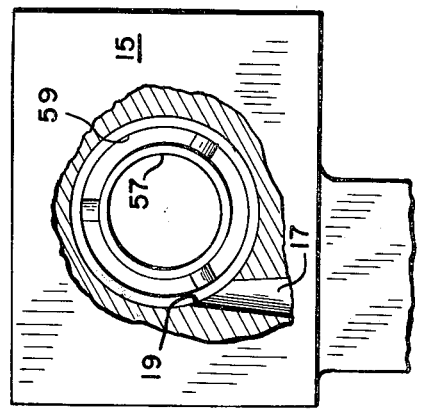
FIG. 2 is an elevational view partly in section of the inlet end of the device.
Figure 4:
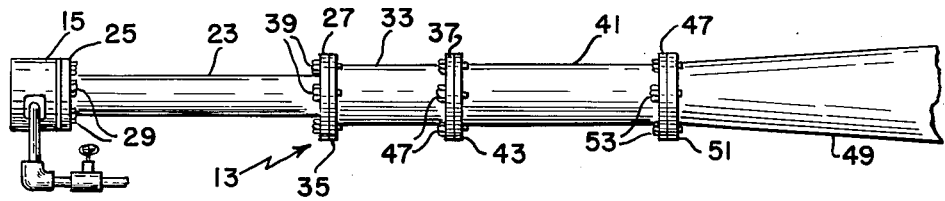
FIG. 4 is a side view of the complete sound generator.

The pressurized fluid enters the inlet end or nozzle section 15 through the inlet valve opening 19. As shown in FIG. 2 this opening occurs at the side of the cylindrical opening in the nozzle section 15. This induces the fluid under pressure to enter tangential to the cylindrical opening and causes a swirling action which results in the formation of a vortex and produces a column of fluid whose pressure varies from its vortex to its outer surface.

To operate the acoustical generator as a generator to simulate the sounds of a reaction type engine, the pressurized fluid, such as compressed air, is fed through the nozzle into the vortex tube. As stated above, a swirling action takes place, and a vortex is formed. As the air passes through the diffuser section 33, it is expanded and passes into the recovery tube 41. It is then discharged through the horn 49 into the atmosphere. As the swirling air passes through the diffuser section, the sound-producing member 55 acts with the other elements to generate the sound effects which are desired.

Figure 5:
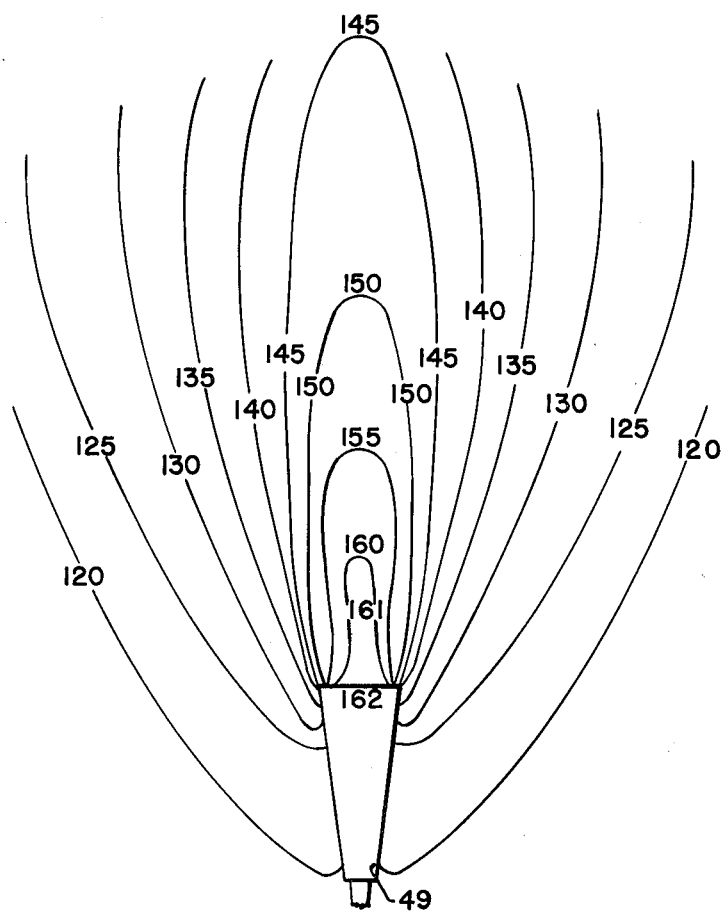
FIG. 5 is a diagram of the approximate distribution of the sound pressure level pattern determined experimentally.
Figure 6:
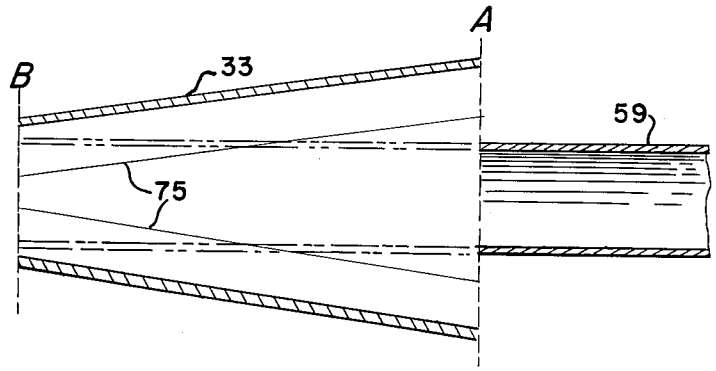
FIG. 6 is a diagram showing the pressure distribution within the diffuser section.
Figure 7:
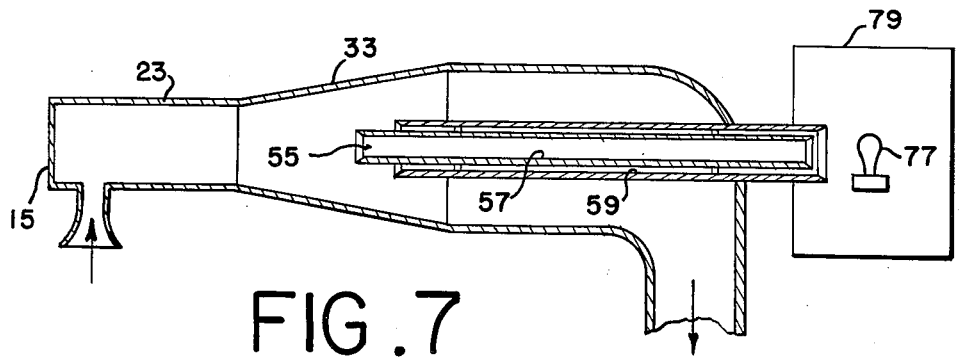
FIG. 7 is a schematic view of one embodiment of the apparatus as used in the testing of an aircraft component.

An acoustical generator built according to the drawing shown in FIG. 1 would produce 850 acoustical watts of power at a maximum energy intensity of 162 decibels with a power input of 6000 watts. The constant acoustical energy intensity lines shown in Fig. 5 includes a flux plot of the constant decibels permeating around the end of the horn 49. From this flux pattern it can be seen that the following noise intensities are produced at different distances from the end of the horn:

162 decibels at 0 inches
161 decibels at 5 inches
160 decibels at 10 inches
153 decibels at 20 inches
150 decibels at 30 inches
144 decibels at 40 inches
145 decibels at 50 inches On important application of the acoustical generator is to provide a means for simulating jet aircraft at high altitudes and is shown in FIG. 7. First looking at FIG. 6 it can be seen how a partial vacuum or positive pressure can be achieved in the sound producing tubes 57 and 59. For simplicity only one tube is shown in FIG. 6. The generator diffuser section 33 is shown with the tube 59 concentric thereto. As the pressurized fluid is swirled inside the diffuser 33, a pressure gradient is formed across the diametrical cross section of the air column. The pressure at the center is theoretically zero and it is maximum near the inside surface of the diffuser. In the case of the generator described above, the maximum pressures reach values of five to ten atmospheres. Consequently, somewhere between the center line and the wall of the diffuser, there exists an imaginary line 75 along which the atmospheric pressure is equal to one atmosphere. Referring to FIG. 6, if one end of the tube 59 is located at position A, and the other end is plugged, a partial vacuum will exist inside the tube 59. When the tube is at position B shown in dotted section, and the end is plugged, the pressure inside the tube will be greater than atmospheric pressure. If the end of tube 59 were not plugged, the air would flow into or out of the tube depending upon its position in the diffuser section 33.

It has been experimentally determined that 90 percent of the sound comes from inside the tubes 57 and 59 so that a specimen 77 located in the sealed chamber 79 may be tested under conditions simulating actual aircraft flight. A schematic diagram of this type of test set-up is shown in FIG. 7 and as noted above, the variation of the position of the tubes 57 and 59 in relation to the diffuser section will cause the proper pressure conditions to prevail in the sealed chamber 79.

Many variables are involved in the design of an effective acoustical generator of the type disclosed herein and little theoretical knowledge is available to assist in such design. However, it is easily seen that variation of the relative sizes and positions of the elements of which the acoustical generator is comprised will change the quality and intensity of the sounds emitting therefrom. Also the efficiency of the apparatus can be increased or decreased by similar variations. Optimum design for a particular application can be achieved by using the basic apparatus herein described with minor modifications.

Therefore, having now described and illustrated certain preferred embodiments of the invention, it will be understood by those skilled in the art that various changes and modifications can be made in the structure and arrangement of the parts without departing from the true spirit and full intended scope of the invention.

What is claimed is:

1. An acoustical generator for simulating the sound of a reaction type aircraft engine comprising an inlet section for admitting a pressurized fluid jet, a vortex tube secured to said inlet section, a diffuser section downstream of said vortex tube, a recovery tube attached to the downstream end of said diffuser section, a horn attached to the downstream end of said recovery tube, and means constructed and arranged within said tubes and sections for fluctuating and vibrating the pressurized fluid jet to cause the emission of high intensity sound from said horn.

2. An acoustical generator for simulating the sound of a reaction type aircraft engine comprising an inlet section for admitting a pressurized fluid jet, a vortex tube attached to said inlet section, a diffuser section attached to said vortex tube, the inner wall of said diffuser section being tapered, a recovery tube having one end secured to the larger end of said tapered diffuser section, a tapered sound directing horn having its smaller end secured to the other end of said recovery tube, a plurality of elongated tubular sound producing members of different diameters, said sound producing members being concentrically mounted within each other and in spaced relation to each other, the upstream end of said sound producing tubes being disposed within said diffuser section and the downstream ends extending beyond said recovery tube.

3. The acoustical generator described in claim 2 wherein the innermost of said sound producing tubes extends closer to the inlet end of said diffuser section while the outermost of said sound producing tubes is disposed further downstream therefrom.

4. The acoustical generator described in claim 2 wherein the end portions of said sound producing tubes are severely chamfered to substantially knife-edge sharpness.

5. An acoustical generator for producing sonic vibrations of high intensity comprising an inlet section for admitting a pressurized fluid jet, a vortex tube attached to said inlet section for swirling the pressurized jet to form a vortex therein, a diffuser section attached to said vortex tube, the inner wall of said diffuser section being tapered to allow expansion of said fluid jet, a recovery tube having one end secured to the downstream end of said diffuser section, a tapered sound directing horn having its smaller end secured to the downstream end of said recovery tube, and a plurality of elongated tubular sound producing members of different diameters, said sound producing members constructed and arranged to be mounted concentrically within each other and having sufficient clearance therebetween to allow for passage of a portion of the fluid jet, the upstream end of said sound producing members being disposed within said diffuser section.

6. The acoustical generator described in claim 5 wherein means are provided for varying the character and intensity of the sounds emitted by changing the relative position of said sound producing tubes with respect to said diffuser section.

7. The acoustical generator described in claim 5 wherein the pressurized fluid jet comprises a compressed air stream entering said inlet at a pressure greater than 100 p.s.i.

8. The acoustical generator described in claim 5 wherein the pressurized fluid jet is injected tangentially into the wall of the inlet section so as to swirl the fluid and form a vortex as said jet passes into said vortex section.

9. A sonic vibration generator for testing aircraft control components comprising an inlet section for admitting a pressurized fluid jet, a vortex tube attached to said inlet section for swirling the pressurized jet to form a vortex therein, a diffuser section attached to said vortex tube, the inner wall of said diffuser section being tapered to allow expansion of said fluid jet, a recovery tube having one end secured to the downstream end of said diffuser section, the other end of said recovery section being open to the atmosphere, a plurality of elongated tubular sound producing members of varying diameters, said sound producing members constructed and arranged to be mounted within each other and having sufficient clearance therebetween to allow for passage of substantially all of the fluid jet stream, and a pressure tight chamber containing a component to be tested, the upstream end of said tubular sound producing members being located in said diffuser section and the downstream end passing into said pressure tight chamber.

10. The sonic generator described in claim 9 wherein there is provided means for varying the pressure in said pressure tight chamber by changing the relative position of said sound producing members with respect to said diffuser section.

References Cited in the file of this patent

FOREIGN PATENTS 7,687     Norway ---------------- Nov. 6, 1899